US005800755A

United States Patent [19]

Withenshaw et al.

[11] Patent Number: 5,800,755

[45] Date of Patent: Sep. 1, 1998

[54] AGGLOMERATED ACTIVE WITH CONTROLLED RELEASE

[75] Inventors: John David Withenshaw, Northop; Mark Ardern Chadwick, Greenfield; William John Wilson, Wirral, all of United Kingdom

[73] Assignee: Warwick International Group Limited, United Kingdom

[21] Appl. No.: 710,340

[22] Filed: Sep. 16, 1996

[30] Foreign Application Priority Data

Sep. 19, 1995 [GB] United Kingdom ................ 9519094.3

[51] Int. Cl.$^6$ ............................ B29C 67/02; C09K 3/00

[52] U.S. Cl. .................... 264/117; 264/118; 252/186.25; 252/186.38

[58] Field of Search .................................. 264/117, 118; 252/186.25, 186.38, 186.39

[56] References Cited

U.S. PATENT DOCUMENTS

| | | | |
|---|---|---|---|
| 3,781,228 | 12/1973 | McDonnell et al. | 510/320 |
| 3,823,090 | 7/1974 | Kame et al. | 510/320 |
| 4,009,113 | 2/1977 | Green et al. | 510/312 |
| 4,372,868 | 2/1983 | Saian et al. | 252/186.41 |
| 4,378,300 | 3/1983 | Gray | 252/186.31 |
| 4,414,130 | 11/1983 | Cheng . | |
| 4,444,674 | 4/1984 | Gray | 252/186.27 |
| 5,100,576 | 3/1992 | Cramer et al. | 252/186.25 |
| 5,112,514 | 5/1992 | Bolkan et al. | 252/186.39 |
| 5,164,195 | 11/1992 | Lew | 424/490 |
| 5,433,881 | 7/1995 | Townend et al. | 252/186.29 |
| 5,458,801 | 10/1995 | Oyashiki et al. | 252/186.25 |
| 5,534,196 | 7/1996 | Chapman et al. | 252/186.27 |
| 5,650,091 | 7/1997 | Millequant et al. | 252/186.25 |

FOREIGN PATENT DOCUMENTS

| | | |
|---|---|---|
| 0164703 | 12/1985 | European Pat. Off. . |
| 47055162 | 10/1972 | Japan . |
| 63-105098 | 5/1988 | Japan . |
| 1248994 | 10/1971 | United Kingdom . |
| 9000593 | 1/1990 | WIPO . |
| 9415010 | 7/1994 | WIPO . |

*Primary Examiner*—Joseph D. Anthony

*Attorney, Agent, or Firm*—Brooks Haidt Haffner & Delahunty

[57] ABSTRACT

An agglomerated active with controlled release comprising a particulate solid active material and a binder characterised in that the binder comprises from 0.02 to 5% by weight of a polyvinyl alcohol, based on the total weight of the agglomerate. The binder system simultaneously provides the desired hardness and release characteristics while maintaining a high level of actives. The active may be a bleach activator such as Tetraacetylethylenediamine.

A process for manufacturing the agglomerate comprises the steps of mixing a particulate solid active material and optionally a portion of polyvinyl alcohol and optionally also a co-binder and then adding an agglomerating solution which optionally contains polyvinyl alcohol binder while mixing and agglomerating and drying the agglomerates to obtain an agglomerate with average particle size in the range 1–2000 microns wherein the agglomerate comprises from 0.02 to 5% by weight based on the total weight of the agglomerate of polyvinyl alcohol.

18 Claims, No Drawings

AGGLOMERATED ACTIVE WITH CONTROLLED RELEASE

The present invention relates to an agglomerated active with controlled release, particularly where the active is a bleach activator for incorporation into washing powder formulations.

Several active materials are used, or have been proposed for use, in detergent formulations. Among them are surfactants, enzymes, sequestrants, persalts and bleach activators. Of these the actives which have most often been proposed for controlled release are enzymes and bleach activators. The most common bleach activator used today is Tetraacetylethylenediamine (TAED). It is a crystalline solid and is usually agglomerated using carboxymethylcellulose and water. Alternatively it may be agglomerated with a synthetic polymer and then coated with further polymer to give a delayed release of active and improve storage stability and hardness. The use of a two stage process is inconvenient and can increase the non-active content of the granule to an unacceptably high level.

WO 88-DK164 (Albright & Wilson Ltd and Novo-Nordisk AS) discloses a stabilised aqueous enzyme dispersion prepared by precipitating a water-soluble polymer from water to form an aqueous dispersion and then mixing the dispersed polymer with an aqueous solution or fine aqueous dispersion of enzyme. The enzyme may be a protease, amylase, cellulase or lipase. The polymer may be polyvinyl alcohol, polyvinylpyrrolidone, a polycarboxylic acid salt, carboxymethyl cellulose salt, gelatin etc. Enzymes protected in this way are said to have good storage stability at relatively low polymer/enzyme ratios and are useful in the formulation of liquid enzymatic detergents.

JP 63105098 A (Showa Denko KK) describes a detergent composition prepared by coating enzymes with polyvinyl alcohol to form microcapsules and dispersing the capsules uniformly in a liquid or gel detergent. The enzymes are micro-encapsulated in a dissolved or dispersed form in a moisture-containing hydroxy compound. The polyvinyl alcohol has an average polymerisation degree of 200–4,000 and a saponification degree of 80% or greater. The liquid or gel detergent consists of a nonionic surfactant and/or an anionic surfactant of 70% or more water. Enzymes include protease, amylase, lipase and cellulase. The coating prevents direct contact with moisture, deactivating surfactants, builders etc., and the microencapsulated form has notably improved storage stability. U.S. Pat. No. 3,823,090 (Nippon Oils & Fats Co Ltd) discloses a coated enzyme. The coating may be selected from two categories of material i.e. non-ionic surface active agents of melting point 40°–110° C. and natural and synthetic sizing agents. Among the sizing agents mention is made of tragacanth gum, gum Arabic, polyvinyl alcohol, polyvinyl acetate etc. The enzyme is coated with sizing agent by forming an aqueous mixture and spray drying it. Polyvinyl alcohol is not used in any of the examples.

U.S. Pat. No. 3,781,228 (Colgate Palmolive Company) is another enzyme related specification in which granules are formed by use of a binding agent such as a polyvinyl alcohol or a carboxyalkyl cellulose, and a detergent builder salt. The enzyme is bound to the surface of the granule. The binder is added in solution. The polyvinyl alcohol has a molecular weight in the range 5,000 to 500,000. The degree of hydrolysis is stated to be within the range 70 to 100%. Polyvinyl alcohol with a polyvinyl acetate content in the range 10 to 30% by weight is preferred. An average degree of polymerisation of 35 to 100 is disclosed. Alternatively sodium carboxymethylcellulose may be used as a binder. Mixtures of these two types of binder are not suggested.

JP 72051562B (Lion) claims a detergent composition which exhibits excellent washability both for starch and oily soil, it consists essentially of a rapidly-soluble almost neutral enzyme-containing detergent composition and an alkaline detergent composition which is treated to start dissolution at rapid rate after a lapse of one third of total washing time. Specifically the alkaline detergent composition is coated with a slowly soluble organic film-forming material such as polyvinyl alcohol, polyvinyl pyrrolidone, polyvinyl acetate, polyvinyl urethane other water-soluble synthetic resins, carboxymethylcellulose, carboxy-methyl starch, hydroxypropyl cellulose and gelatin etc. to delay the dissolution.

None of these enzyme related publications attributes any particular advantage to polyvinyl alcohol and none gives any indication that a mixed coating or binder system should be used.

EP 164 703 A (Henkel) discloses an article containing a mixture of two or more active components embedded in organic, flexible, film-forming, water-soluble polymers. The active components are selected from: nonionic surfactants; a per-compound activator, a quaternary ammonium compound; an addition product of 1–6 moles ethylene oxide with 1 mole primary $C_{10-16}$ alk(en)ylamine or $RNH.CH_2CH_2COONa$ ($R=C_{10-18}$ alk(en)yl). The article is easily soluble in cold water and cold washing liquors and thereby delivers the embedded actives to improve removal of bleachable soil and of fat, oil and pigments from textiles.

U.S. 4,378,300 (Colgate) discloses a bleaching and laundering composition which comprises a peroxygen compound, phthalic anhydride as activator, and diethylene triamine pentamethylene phosphonic acid and/or its water-soluble salt. Bleaching detergent compositions comprise 5–50 wt. % of the above composition, 5–50 wt. % detergent surfactant and 1–60 wt. % detergent builder salt, the balance being water and optional filler salts. Preferably peroxygen compounds are alkali metal perborate and percarbonate. Optionally the peroxygen compound and phthalic anhydride are coated to prevent premature activation.

WO94/15010 (The Procter & Gamble Company) discloses solid peroxyacid bleach precursor compositions coated with water soluble acidic polymers. The precursor may optionally be co-agglomerated with the polymer before coating. The polymer should have a water solubility at 20° C. of greater than 5 g/l and a molecular weight of 1000 to 250,000. A 1% solution of the polymer has a pH of less than 7, preferably less than 5.5. The most preferred precursor is Tetraacetylethylenediamine. Usually at least 90% of the precursor has a particle size of less than 150 microns. Polycarboxylate polymers are the preferred acid polymers. The example uses only one polymer to agglomerate. No use is made of any polyvinyl alcohol.

GB 1248 994 (Colgate Palmolive Company) describes the manufacture of agglomerated colored granules of builder salt. The binder may be a polyvinyl alcohol or alkali metal carboxyalkyl cellulose or a mixture thereof. There are no examples using the mixture and no advantage is apparent for such a mixture. Up to 5 parts per 100 of plasticizer, such as propylene glycol or glycerin, may be included in the polyvinyl alcohol. The binders are dissolved in water before application to the builder salt. The dye or pigment may be added as a solution with the binder or dry mixed with the builder salt. The level of dye or pigment lies in the range up to 8% of the agglomerate, preferably 1.5%. Sodium tripolyphosphate is the preferred builder salt. The dyes used are not capable of performing a binding function and are therefore not co-agglomerating with the binder.

In example 1 62.5 parts of builder salt are agglomerated with a solution containing 7.5 parts of polyvinyl alcohol and 4 parts Monastral blue dye.

U.S. Pat. No. 5,164,195 (Southwest Research Institute) is concerned with a salt sensitive capsule which dissolves in the mouth to release encapsulated ingredients. Polyvinyl alcohol and a number of nonionic cellulose derivatives are proposed for the salt sensitive coating layer. There is no suggestion to use these as agglomerating aids, nor is there any suggestion to use mixtures of them. The capsules may be contained in an adhesive gel. CMC is proposed as an adhesive material for this purpose. It is proposed to mix the cellulose derivative with a hydrocarbon gel base composed of polyethylene and mineral oil. The purpose of the adhesive is to fix the capsule to the tissue of the mouth for controlled delivery of the active ingredient. It is not used as an agglomerating material.

U.S. Pat. No. 5,100,576 (Hoechst Atiengesellschaft) describes a process in which a dry bleach activator (especially Tetraacetylethylenediamine) is moistened with water and then mixed with an agglomerating or coating agent, preferably Sodium carboxymethylcellulose. The mixture is then agglomerated. Disintegrants and dyes can also be added. There is no teaching to use polyvinyl alcohol.

U.S. Pat. No. 4,009,113 (Lever Brothers Company) describes forming a precursor into a composite particle which is then coated for use in a powder detergent composition using a hydrogen peroxide bleaching system. The protective coating can give release after a selected time interval, provided the activator is fully released before 5 minutes from the end of the wash cycle. The activator is mixed with a carrier material which is preferably a mixture of liquid paraffin and sodium lauryl sulphate. It is then formed into a granule. The granule is then coated with a material selected from poly(vinyl alcohol), poly (acrylamide), certain copolymers of acrylic acid, methacrylic acid or maleic anhydride, starch and its modifications and derivatives, for example dextrin and low viscosity starches, water soluble cellulose ethers such as methyl cellulose, hydroxyethyl cellulose, gelatin and water soluble gums such as gum Arabic and gum tragacanth: dextrin or sucrose are preferred. Mixtures of these coating materials are not taught. A mixture of Poly vinyl alcohol and sodium lauryl sulphate as wetting agent is used as coating material in examples 1 and 2. Polyvinyl alcohol is used alone as the coating in other examples coating phthalic anhydride activator. The one example with TAED coats with dextrin.

DE 4236494 (Kao) describes a granular bleach activator co-agglomerated with sodium perborate, sodium percarbonate or a water soluble substance which may be either an inorganic salt selected from preferred inorganic core particles include sodium dihydrogenphosphate, potassium dihydrogenphosphate, potassium chloride, sodium chloride, sodium sulphate, magnesium sulphate, ammonium phosphate and sodium nitrate, among with particularly preferred is sodium sulphate. (see col 4 lines 7–11). Preferred is sodium sulphate. Organic core particles are preferably citric acid, sugar, sodium alginate and calcium acrylate. No mention is made of polyvinyl alcohol (or sodium carboxymethylcellulose) as a core material. Agglomeration is effected by water soluble organic binders including polyethylene glycol, polypropylene glycol and nonionic surfactants. The agglomerate is optionally coated with a water soluble high molecular weight substance. Among the list there are mentioned sodium carboxymethylcellulose and polyvinyl alcohol. Hydroxypropylmethylcellulose and polyvinyl alcohol are preferred coating polymers.

According to the present invention there is provided an agglomerated active with controlled release comprising a particulate solid active material and a binder characterised in that the binder comprises from 0.02 to 5% by weight of a polyvinyl alcohol, based on the total weight of the agglomerate. Throughout this specification the term polyvinyl alcohol includes modified polyvinyl alcohols as hereafter defined unless the context demands otherwise.

The polyvinyl alcohol may be a non-ionic polyvinyl alcohol, for instance an unmodified polyvinyl alcohol. It may be fully or partially hydrolysed (that is the acetate groups derived from the vinyl acetate monomers used to form the polyvinyl alcohol may be fully or partially saponified). The polyvinyl alcohol may also be an anionic or cationic polymer, that is it is a modified polyvinyl alcohol. Anionic groups introduced into the polymer may be acid groups, for instance carboxylic or sulphonic acid groups. Cationic groups introduced into the polymer are usually amine groups, for instance primary, secondary or tertiary amine groups or, preferably, quaternary ammonium ions. The polyvinyl alcohol may be modified by introduction of one or more types of group, for instance by non-ionic groups as well as either cationic or anionic groups. Examples of nonionic groups are amides, imines, imides, acetoacetylates and other ester-containing moieties.

The polyvinyl alcohol generally has a molecular weight in the range 10,000 to 200,000, preferably 20,000 to 120,000. The polyvinyl alcohol properties are usually modified by control of the degree of hydrolysis of the polymer chain (replacement of acetate groups with hydroxide groups) and by control of the polymer molecular weight. However, it is possible to further modify the polyvinyl alcohol property by substitution of acetate/hydroxide groups with e.g.: carboxylic acids, sulphates, sulphonic acids, acetoacetates, amine, imide and imine-containing groups—this can be achieved either by reaction with the preformed polyvinyl alcohol chain or, for example, by hydrolysis of vinyl acetates with monomers containing the desired functionality.

The extent of substitution and selection of modified groups as well as degree of hydrolysis and polymer molecular weight may be selected by routine experiment to provide a suitable combination of storage stability hardness and release characteristics in use. Generally as the degree of hydrolysis increases the agglomerate produced becomes harder with slower release. This trend is repeated as the polymerisation increases but to a lesser extent than that attributable to degree of hydrolysis. As the degree of polymerisation increases so does the viscosity of an aqueous solution of the polyvinyl alcohol and this has implications for the ease of processing.

Preferably the binder further comprises a co-binder and the total content of the co-binder and the polyvinyl alcohol binder is from 0.25 to 15% by weight based on the total weight of the agglomerate. Advantageously the co-binder is selected from organic salts, inorganic salts, clays and polymers, for instance synthetic or natural polymers or derivatives thereof, most advantageously it is a cellulose derivative, preferably carboxymethylcellulose. A suitable organic salt is trisodium citrate.

The agglomerated active material may for example be a component of a detergent composition, preferably a bleach component including a bleach activator, a persalt and a bleaching catalyst. Preferably it is a bleach activator. The bleach activator may be any one or mixtures of more than one acyl donor. Preferably, the bleach activator is one or mixtures of more than one of the compounds of the formula I:

I in which L is a leaving group attached via an oxygen or a nitrogen atom to the C=O carbon atom and $R^1$ is an alkyl, aralkyl, alkaryl, or aryl group, any of which groups has up to 24 carbon atoms and may be substituted or unsubstituted.

The leaving group L is preferably a compound, the conjugate acid of which has a $pK_a$ in the range 4 to 13, preferably 7 to 11, most preferably 8 to 11.

It is preferred that $R^1$ is an aliphatic group, preferably a $C_{1-18}$ alkyl group, or an aryl group.

In the present invention the term alkyl includes straight, branched and cyclic groups. It can also include unsaturation.

In the formula I, L and $R^1$ may be joined to form a cyclic compound, usually a lactone or a lactam. These cyclic groups may include heteroatoms, for instance oxygen or optionally substituted nitrogen atoms, carboxyl groups as well as $—CH_2—$ groups or substituted derivatives thereof. They may be saturated or unsaturated. L can itself comprise a cyclic group, including heterocyclic groups, for instance joined to the C=O group of the compound I via the heteroatom Substituents on $R^1$ and L can include hydroxyl, $=N—{}^2R$ in which ${}^2R$ is selected from any of the groups represented by $R^1$ and is preferably lower alkyl amine, acyl, acyloxy, alkoxy, aryl, aroyl, aryloxy, aroyloxy, halogen, amido, and imido groups and the like as well as other groups not adversely affecting the activity of the compound.

When the activator is a N-acyl compound preferred compounds include those having at least two carbon atoms in the acyl group, especially compounds having the formula II:

II in which $R^4$ is an alkyl, alkenyl, aralkyl, alkaryl or aryl group, any of which groups has up to 24 carbon atoms and may be substituted or unsubstituted, and $—NR^2R^3$ is a leaving group in which $R^2$ and $R^3$ are independently selected from H, $C_{1-24}$-alkyl, -alkenyl, -aralkyl, alkaryl or -aryl groups, and carbonyl-containing moieties having at least 2 carbon atoms in which the carbonyl group is joined to the nitrogen atom in the formula I, in which $R^2$ and $R^3$ can be joined together as a cyclic group and/or $R^4$ can be joined to either $R^2$ or $R^2$ to form a cyclic group. particularly preferred compounds of formula II are those in which $R^4$ is an aliphatic group, preferably a $C_{1-18}$-alkyl, or $C_{2-18}$-alkenyl group, or is an aryl group.

When the activator is an O-acyl compound preferred compounds include esters of $C_2$ or higher carboxylic acids. Particularly preferred are compounds of formula III:

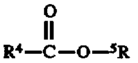
III in which $R^4$ is as described above for N-acyl compounds, and ${}^5R$ is selected from $C_{1-24}$-alkyl, -alkenyl, -aralkyl, -alkaryl and -aryl groups, any of which are substituted or unsubstituted, $R^4$ and $R^5$ optionally being joined to form a cyclic group.

In the invention the compound of the formula I can be any N-acyl or O-acyl donor compound, which has been described as a bleach activator for use in laundry detergents. The compound of the formula I may be an anhydride, but is preferably an ester and more preferably, an amide derivative.

Amide derivatives include acyl imidazolides and N,N-diacylamides, such as Tetraacetyl-ethylenediamine (TAED). Other examples of N-acyl derivatives are:

a) 1,5-diacetyl-2, 4-dioxohexahydro-1,3,5-triazine (DADHT);

b) N-alkyl-N-sulphonyl carbonamides, for example the compounds N-methyl-N-mesyl acetamide, N-methyl-N-mesyl benzamide, N-methyl-N-mesyl-p-nitrobenzamide, and N-methyl-N -mesyl-p-methoxybenzamide;

c) N-acylated cyclic hydrazides, acylated triazoles or urazoles, for example monoacetyl maleic acid hydrazide;

d) O,N,N-tri substituted hydroxylamines, such as O-benzoyl-N,N-succinyl hydroxylamine, O-p -nitrobenzoyl-N,N-succinyl hydroxylamine and O,N,N-triacetyl hydroxylamine;

e) N,N'-diacyl sulphurylamides, for example N,N'-dimethyl-N-N'-diacetyl sulphuryl amide and N,N'-diethyl-N, N'dipropionyl sulphurylamide;

f) 1,3-diacyl-4,5-diacyloxy-imidazolines, for example 1,3-diformyl-4,5-diacetoxy imidazoline, 1,3-diacetyl-4,5-diacetoxy imidazoline, 1,3-diacetyl-4,5-dipropionyloxy imidazoline;

g) Acylated glycoluris, such as tetraacetyl glycoluril and tetraproprionyl glycoluril;

h) Diacylated 2,5-diketopiperazines, such as 1,4-diacetyl-2, 5-diketopiperazine, 1,4-dipropionyl -2,5-diketopiperazine and 1,4-dipropionyl-3,6-dimethyl-2,5-diketopiperzine;

i) Acylation products of propylene diurea and 2,2-dimethyl propylene diurea, especially the tetraacetyl or tetrapropionyl propylene diurea and their dimethyl derivatives;

j) Alpha-acyloxy-(N,N')polyacyl malonamides, such as alpha-acetoxy -(N,N')diacetyl malonamide.

k) O,N,N-trisubstituted alkanolamines, such as O,N,N-triacetyl ethanolamine.

l) Cyanamides, such as those disclosed in DE-A-3, 304,848.

m) N-acyl lactams, such as N-benzoyl-caprolactam, N-acetyl caprolactam, the analogous compounds formed from $C_{4-10}$ lactams.

n) N-acyl and N-alkyl derivatives of substituted or unsubstituted succinimide, phthalimide and of imides of other dibasic carboxylic acids, having 5 or more carbon atoms in the imide ring.

Alternatively the compound may be an ester, for instance.

o) sugar esters, such as pentaacetylglucose, p) esters of imidic acids such as ethyl benzimidate, q) triacylcyanurates, such as triacetylcyanurate and tribenzoylcyanurate, r) esters giving relatively surface active oxidising products for instance of $C_{8-18}$-alkanoic or -aralkanoic acids such as described in GB-A-864798, GB-A-1147871 and the esters described in EP -A-98129 and EP-A-106634, for instance compounds of the formula I where L comprises an aryl group having a sulphonic acid group (optionally salified) substituted in the ring to confer water solubility on a benzyl group, especially nonanoyloxy-benzenesulphonate sodium salt (NOBS), isononanoyloxy-benzenesulphonate sodium salt (ISONOBS) and benzoyloxy-benzenesulphonate sodium salt (BOBS), s) phenyl esters of $C_{14-22}$-alkanoic or-alkenoic acids, t) esters of hydroxylamine, u) geminal diesters of lower alkanoic acids and gem-diols, such as those described in EP -A-0125781 especially 1,1,5-triacetoxypent-4-ene and 1,1,5,5-tetraacetoxypentane and the corresponding butene and butane compounds, ethylidene benzoate acetate and bis(ethylidene acetate) adipate and v) enol esters, for instance as described in EP-A-0140648 and EP-A-0092932.

Where the activator is an anhydride it is preferably a solid material, and is preferably an intra -molecular anhydride, or a polyacid polyanhydride. Such anhydride compounds are more storage stable than liquid anhydrides, such as acetic anhydride. Anhydride derivatives which may be used as an activator include:

w) intra-molecular anhydrides of dibasic carboxylic acids, for instance succinic, maleic, adipic, phthalic or 5-norbomene-2,3-dicarboxylic anhydride, x) intermolecular anhydrides, including mixed anhydrides, of mono-poly-basic carboxylic acids, such as diacetic anhydride of isophthalic or perphthalic acid y) isatoic anhydride or related compounds such as described in WO-A-8907640 having the generic formula IV

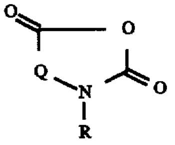
IV wherein Q is a divalent organic group such that Q and N together with the carbonyl groups and oxygen atom of the anhydride group form one or more cyclic structures and R is H, alkyl, aryl, halogen or a carbonyl group of a carboxyl-containing function; or benzoxazin-4-ones as described in WO-A-8907639, that is compounds of the formula V

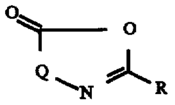
V wherein Q is a divalent organic group and R is H, alkyl, alkaryl, aralkyl, alkoxyl, haloalkyl, amino, aminoalkyl, carboxyic group or a carbonyl containing function; preferably 2-phenyl-(4H)3,1-benzoxazin-4-one (2PB4);

z) polymeric anhydrides such as poly(adipic) anhydride or other compounds described WO -A-9306203.

Most preferably the bleach activator is Tetraacetylethylenediamine.

The present invention is also of use for improving the storage stability of a range of other less preferred actives for incorporation into cleaners, detergents, especially laundry or dish washing detergents containing surfactants and bleaching systems, and other bleaching compositions. The best results have been obtained for bleach activator actives, especially TAED. Other suitable actives include builders, perfumes, optical brightening aids, enzymes, photo-activatable bleach components and sequestrants. Combinations of any of these actives may be made provided care is taken not to combine incompatible actives. For example those that will react with one another during manufacture.

The agglomerates of the present invention generally have a size in the range 0.1–2000 μm, preferably 100–2000 μm.

The present invention also provides compositions containing the novel agglomerates. The composition generally contains other cleaner components organic salts, and is preferably a complete detergent composition, especially a laundry, or heavy duty, detergent. The composition therefore preferably contains surfactants, builders, other bleach components, enzymes, sequestrants, perfumes, optical brightening agents, photo-activatable bleach components, inorganic salts, soil suspending agents, anti-redeposition aids and other conventional components. Where, in the preferred aspect, the novel agglomerates contain a bleach activator the composition further contains a peroxygen bleach source, such as hydrogen peroxide and/or inorganic persalts.

Whilst the best effects are thought to result from use of carboxymethylcellulose/polyvinyl alcohol mixtures as binders for an activator such as TAED, a lesser degree of improvement is also possible for carboxymethylcellulose bound agglomerates which are then coated with either polyvinyl alcohol or a mixture of carboxymethylcellulose and polyvinyl alcohol.

The agglomerates according to the invention are advantageously made according to a process which comprises the steps of first mixing the solid ingredients, these will normally comprise TAED and carboxymethylcellulose, together with any other ingredients of the final agglomerate that are conveniently added as solids. Among such ingredients there are: sequestrants, colorants, clays, silicates, organic and inorganic salts, and synthetic polymers including the synthetic polyacrylate polymers described in PCT/GB94/02520. The solid mixture is made homogeneous and then sprayed with a solution of polyvinyl alcohol. This solution, or a second simultaneous spray, may also add other ingredients conveniently added as a solution or suspension, such as sequestrants polyacrylates, colorants, silicates, inorganic and organic salts. The mixing operation is preferably carried out in a high shear mixer such as a Lodige® KM, CB, or M, or a Schugi Flexomix® mixer. The agglomerate can be used in this form or it can then be coated with either a known coating, such as described in WO94/15010 or it can be coated with a solution of polyvinyl alcohol either alone or in conjunction with a second material.

Accordingly the present invention also comprises a process for making a agglomerated active with controlled release comprising the steps of mixing a particulate solid active material and optionally a portion of polyvinyl alcohol and optionally also a co-binder and then adding an agglomerating solution which optionally contains polyvinyl alcohol binder whilst mixing and agglomerating and drying the agglomerates to obtain an agglomerate with average particle size in the range 1–2000 microns wherein the agglomerate comprises from 0.02 to 5% by weight based on the total weight of the agglomerate of polyvinyl alcohol. Preferably the co-binder is included as a particulate solid which is mixed with the solid active material. The co-binder may be selected from organic salts, inorganic salts, clays and polymers, for instance synthetic or natural polymers or derivatives thereof, preferably the co-binder is a cellulose derivative, most preferably it is carboxymethylcellulose. A suitable organic salt is trisodium citrate.

Desirably the agglomerating solution contains all the polyvinyl alcohol, and is preferably free of polymeric co-binder. The agglomerating solution may be aqueous and preferably contains no non-aqueous solvent.

Advantageously the active material is a detergent component, preferably a bleaching component, more preferably a bleach activator, most preferably Tetraacetylethylenediamine.

The invention also encompasses the use of a stable, hard bleach activator agglomerate produced in accordance with claim 13, as a component in a detergent formulation which contains a peroxygen source, without there being a separate encapsulation coating applied to the agglomerate.

Without wishing to be bound by theory it is believed that the carboxymethylcellulose, other cellulose derivatives and co-binders act synergistically with the polyvinyl alcohol by soaking up excess water during formation of the agglomerate. An agglomerate of improved hardness whilst maintaining a high level of actives relative to agglomerates made using only cellulose binders, can be formed and used as a result of the present invention. This is especially advantageous for use in compact detergent formulations where restricted formulation space leads formulators to demand ever higher active levels for agglomerated additives.

The invention also encompasses a detergent composition containing surfactant and an agglomerated active. The agglomerate may be produced by a process according to the invention and it should not have been treated in a subsequent coating or encapsulating step. When the active material is a bleach activator the detergent composition also contains a peroxygen source.

The invention will now be further described with reference to the following non-limiting examples:

To a base formulation containing 17.5 parts of TAED and 1 part of carboxymethyl cellulose a selected polyvinyl alcohol was added as an aqueous solution. The strength of the solution relates to the amount of polyvinyl alcohol present in the granular product as shown in Table 1.

TABLE 1

| Polyvinyl alcohol solution concentration % | % solid Polyvinyl alcohol on agglomerate (W/W) |
|---|---|
| 1 | 0.25 |
| 5 | 1.25 |
| 10 | 2.5 |

The polyvinyl alcohol polymers and their derivatives used are detailed in Table 2. Mixtures could also be used to give characteristics reflecting the blend chosen.

TABLE 2

| Polyvinyl alcohol | Degree of Polymerisation | Molecular Weight | Degree of hydrolysis |
|---|---|---|---|
| A | 2600 | 114900 | 99.4–100 |
| B | 500 | 22200 | 98.5–100 |
| c | 1700 | 76200 | 97–98.5 |
| D | 2100 | 110900 | 78.5–81.5 |
| E | 550 | 29000 | 78.5–82 |
| F | carboxylated substitution | ~70000 | 93–95 |
| G | Cationic polyvinyl alcohol | ~55000 | 85.5–88 |
| H | Acetoacetylated substitution | ~50000 | 95–97 |

By the selection of a polyvinyl alcohol with an appropriate degree of hydrolysis and molecular weight the performance characteristics of an agglomerated product can be varied with respect to active release, hardness and storage stability.

The addition of low levels (1–2% by weight) of polyvinyl alcohol improves both hardness and storage stability compared with a control agglomerate made using carboxymethylcellulose and water as the binder system and not containing any polyvinyl alcohol. It also enables the peracid release to be controlled, for example to minimise localised dye damage.

The selection of low, medium and high shear mixers can be used to vary the degree of performance characteristic changes obtained and also to impart other properties to the agglomerate. Examples of this are bulk density and hardness which both increase with higher shear mixture, however, peracid release remains largely unchanged. The improvements in hardness resulting from mixer type and those resulting from polyvinyl alcohol selection are additive although the total improvement may not be as large as a simple addition of the two effects obtained independently would achieve.

One of the surprising benefits of the use of polyvinyl alcohol and carboxymethylcellulose to bind agglomerates is that they can attain performance in a one stage process which is equivalent to that produced by the prior art two stage processes, such as that in WO 94/15010.

EXAMPLE 1

Release of peracetic acid, or more accurately the formation of peracetate anions, from an agglomerate put into a standard laundry detergent base was determined by iodometric titration. For simplicity both per species are referred to as peracid in this specification.

The peracid release profile becomes more linear and more retarded as the molecular weight and, more significantly, the degree of hydrolysis of the polyvinyl alcohol used in the granulation process are increased. Data showing this for polyvinyl alcohol types A, C and E is given in Table 3. The numbers in the table are the percentage of theoretical maximum peracetic acid that is detected at the time an aliquot is titrated.

TABLE 3

| Time (mins) | A | C | E | Control |
|---|---|---|---|---|
| 2 | 2 | 4 | 12 | 30 |
| 5 | 10 | 10 | 26 | 65 |
| 15 | 26 | 20 | 55 | 88 |
| 25 | 38 | 30 | 72 | 92 |

The table shows how selection of the polyvinyl alcohol binder may be used to control release of the peracid species thus providing a 'potential' window for the operation of bleach sensitive components within the detergent formulation and wash cycle. Table 4, below, shows that the delay in release of the activator species is achieved without compromising wash performance.

Cotton swatches washed using European washing conditions at 40° C. (BS 4923 5A) using equal levels of bleach activator component with sodium perborate monohydrate in a standard zeolite-built detergent show at least equivalent stain removal for 12 stain types. The four formulations were the same as those tested above; i.e. polyvinyl alcohol types A, C, E and a control formulation. Tests are done in a Wascator (FOM 71 MP) machine. The detergent formulation WMP Base Standard Formulation based on:

5% wt activator
10% wt PBS1
85% wt WMP Base.
Total Dosage=100 g (equivalent to 5 g/l)

The following are the details of the stained swatches used in the test, a mixture of bleachable and detergency monitoring stains was used:

1. Bleachable Stains

RW—red wine stains
BC1—tea with clay stains
BC2—coffee stains
BC3—tea stains
BC4—curry stains
BC5—red beet stains
AS4—chlorophyll with vegetable oil stains Detergency Responsive Stains AS9—low temperature detergent performance monitor. Responsive to builder/water hardness and product concentration.

AS12—an overall performance monitor for all temperatures. Has a low concentration of milk powder and therefore also has a small (proteolytic) enzyme response. AS12 also responds to builder/water hardness, oxidising bleaches (slightly), wash time and product concentration.

E101—olive oil/carbon black stains.

E116—blood/milk/carbon black stains. Fixing of this stain can, in some circumstances, be used as a measure of bleach performance.

WFK10D—WFK soil and sebum (Bey) stains.

The swatches were washed with a ballast load of 2.5 kg polyester cloths. Stain Removal was measured by measuring reflectance (at 460 nm, UV filter at 420 nm) of stained swatches to get % Z Brightness (Bri) before and after wash test and then calculating % stain removal by:

$$\frac{(\%\ Z\ Bri\ \text{Before} - \%\ Z\ Bri\ \text{After})}{(\%\ Z\ Bri\ \text{unbleached cotton} - \%\ Z\ Bri\ \text{After})} \times 100$$

TABLE 4

| | STAIN REMOVAL (% BRIGHTNESS) | | | |
|---|---|---|---|---|
| SWATCH | TABLE 3 CONTROL | TABLE 3 A | TABLE 3 C | TABLE 3 E |
| RW | 45.5 | 45 8 | 42.6 | 43.7 |
| BC1 | 13.1 | 13.2 | 12.2 | 12.7 |
| BC2 | 14.0 | 14.0 | 13.8 | 14.2 |
| BC3 | 23.8 | 23.6 | 21.9 | 24.1 |
| BC4 | 13.7 | 14.3 | 14.7 | 14.2 |
| BC5 | 25.2 | 26.3 | 24.9 | 25.5 |
| AS4 | 10.2 | 11.9 | 10.7 | 11.2 |
| AS9 | 42.3 | 42.9 | 45.0 | 45.8 |
| AS12 | 49.6 | 50.5 | 51.6 | 51.1 |
| E101 | 32.9 | 35.1 | 35.4 | 28.9 |
| E116 | 36.9 | 42.6 | 43.1 | 35.7 |
| WFK10D | 44.0 | 44.4 | 47.3 | 45.3 |

EXAMPLE 2

To determine the effect of polyvinyl alcohol concentration on an agglomerated actives release profile a series of agglomerates was made using polyvinyl alcohol C. The peracid release was measured at 20° C. using the same procedure as for example 1. For agglomerates containing polyvinyl alcohol a change in performance characteristics representing a delayed and controlled release profile is observed relative to the Control. Similar effects were observed at 40° C. The modification of the release profile becomes less as the concentration of polyvinyl alcohol is increased, as can be seen from Table 5 which gives the % Peracid release over time at 20° C. for polyvinyl alcohol sample C at varying concentrations, again including a 0% polyvinyl alcohol control.

TABLE 5

| | concentration of polyvinyl alcohol in solution % | | | |
|---|---|---|---|---|
| Time (mins) | 0 (control) | 1 | 5 | 10 |
| 2 | 30 | 4 | 4 | 4 |
| 5 | 65 | 12 | 10 | 8 |
| 15 | 88 | 26 | 20 | 18 |
| 25 | 92 | 40 | 30 | 30 |

From Table 5 and Table 1 it can be seen that increasing the level of polyvinyl alcohol by weight based on the final agglomerate from 1.25% to 2.5% gave little change in release. We also found that a similar 1.5% optimum could be detected in corresponding experiments using polyvinyl alcohol A.

EXAMPLE 3

Experiments were performed to find the minimum level of polyvinyl alcohol required to be present in the agglomerate, whist maintaining the performance modification. The Polyvinyl alcohol is applied to the dry powder mixture of 94%TAED 6%CMC in a Lilliput Schugi® as an air atomised spray of an aqueous solution. By variation of the Polyvinyl alcohol solution strength it is possible to vary the quantity of Polyvinyl alcohol applied to the agglomerate. Polyvinyl alcohol used was grade C. The agglomerate friability and peracid release was measured for each agglomerate. Results are given in Table 6. The result for 0.02% Polyvinyl alcohol is statistically indistinguishable from the control with no polyvinyl alcohol.

TABLE 6

| | % C | % C | Peracid Release | | | |
|---|---|---|---|---|---|---|
| Ex | Soln. | dry | 2 min | 5 min | 15 min | 30 min |
| 1 | 0 | 0 | 26 | 59.5 | 83 | 89 |
| 2 | 1 | 0.22 | 3.5 | 8.5 | 24 | 36 |
| 3 | 0.5 | 0.07 | 3 | 12 | 33 | 50 |
| 4 | 0.1 | 0.02 | 17.5 | 40.5 | 76.5 | 83 |

EXAMPLE 4

To determine the extent to which CMC could be substituted by other materials as the co-binder for the polyvinyl alcohol a series of experiments were performed. Again peracid release and friability were used as assessment criteria. Co-binders tested were tri-sodium citrate (Na.Cit), sodium pyrophosphate (Na.Pyro), and potassium silicate solution (K-Sil). Polyvinyl alcohol grade C was used in each case. A CMC control without polyvinyl alcohol was also tested. Results are given in Table 7. Peracid species release testing was carried out in a standard base detergent with a persalt at 20° C.

TABLE 7

| | % C | % C | Peracid Release | | | |
|---|---|---|---|---|---|---|
| Ex | Soln. | dry | 2 min | 5 min | 15 min | 30 min |
| CMC | 0 | 0 | 26 | 52 | 80 | 85 |
| C/CMC | 5 | 1.12 | 4 | 9 | 24 | 36 |
| C/Na.Cit | 5 | 0.95 | 3 | 12 | 25 | 36 |
| C/Na.Pyro | 5 | 0.97 | 2 | 12 | 32 | 43 |
| C/K-Sil | 5 | 0.5 | 4 | 9 | 32 | 37 |

EXAMPLE 5

The hardness of polyvinyl alcohol agglomerate was determined using a modified ball mill method which measures friability according to the percentage of fines generated. Hardness was found to be affected by the degree of hydrolysis and molecular weight of the polyvinyl alcohol used and also by the amount in the agglomerate.

For agglomerates made with a 1% Polyvinyl alcohol solutions all were at least equivalent to the control agglomerate without polyvinyl alcohol and some were harder. When 5% polyvinyl alcohol solutions were used all of the agglomerates were harder (less friable) than the control. Therefore it is apparent that there is a lower limit to the amount of polyvinyl alcohol required to produce a noticeable performance effect. This appears to be around 1% minimum polyvinyl alcohol by weight based on the final product. The maximum solution concentration appears less critical when frangibility data is being considered as generally the higher the percentage solution of polyvinyl alcohol in use the less friable the agglomerate is. Ultimately the maximum concentration possible is determined by the increase in viscosity of the solution to an unacceptable level and by the quantity of solution that can be applied to the powder mixture before saturation and over-wetting occurs. Friability data is given in Table 8.

TABLE 8

| | Least Friable— | | | —Most Friable | | |
|---|---|---|---|---|---|---|
| Polyvinyl Alcohol D/C | A/B | G | F | H | E | control |
| 1.0163934 | 0.95946 | 8.7 | 9.6 | 10.5 | 11.9 | 13.6 |

The values in Table 8 are the % amount of agglomerate with particle size less than 425 μm for 5 agglomeration with 5% polyvinyl alcohol solution. The number gives an indication of how much the agglomerate has broken down under attrition in the ball mill test. The lower the number the harder the agglomerate.

EXAMPLE 6

Agglomerates were tested for storage stability in a standard compact zeolite built detergent base.

All of the polyvinyl alcohol agglomerates were more stable than the control. Table 9 shows results for 9 week storage tests in laminated boxes using percarbonate as a persalt.

TABLE 9

| Grade of polyvinyl alcohol used (at 5%) | % TAED remaining in sample | Stability Coefficient |
|---|---|---|
| Control (No Polyvinyl alcohol) | 22.9 | 1 |
| A | 37.4 | 3 |
| B | 38.7 | 3 |
| C | 45.0 | 4 |
| D | 37.7 | 3 |
| E | 25.6 | 2 |

The stability coefficient ranks the agglomerates qualitatively while banding together agglomerates of equivalent stability. A higher number means a more stable agglomerate.

EXAMPLE 7

This example illustrates that the levels of co-binder used in earlier examples (5 or 6%) are non-limiting for the invention, and that it is possible to utilise a broad range of co-binder levels to provide the required properties and release. Polyvinyl alcohol type B is used with 1%, 5% and 10% CMC. Friability and 'peracid' release was measured as before and results are given in Table 10.

TABLE 10

| | % B | Friability | Peracid Release | | | |
|---|---|---|---|---|---|---|
| % CMC | Soln. | % < 425 μm | 2 min | 5 min | 15 min | 30 min |
| 5.5 | 0 | 11.8 | 10 | 46 | 82 | 86 |
| 1 | 5 | 11 | 5 | 11 | 27 | 42 |
| 5 | 5 | 7 | 5 | 8.5 | 30 | 38 |
| 10 | 5 | 9 | 5.5 | 14.5 | 30.5 | 46 |

EXAMPLE 8

In this example the fabric dye damage resulting from use of an agglomerate of 2PB4 according to the present invention was compared with a CMC control 2PB4 agglomerate without any polyvinyl alcohol. Table 11 gives the results. A low number indicates less damageand the code refers to the type of damge: L=local damage, D=Dispersed damage.

TABLE 11

| FABRIC | 2PB4/CMC | 2PB4/CMC/NH26 |
|---|---|---|
| Reactive Red | 8 L/D | 4 L |
| Commercial brown | 4 D | 1 |
| P & G Wool | 9 L/D | 3 L |
| Immedial Black | 6 mostly L | 4 L |
| Hercosett Wool | 0 | 0 |
| WFK Yellow | 0 | 0 |
| Red Wool | 5 D | 2 D |
| WFK Green | 0 | 0 |
| Black Silk | 1 | 1 |
| Commercial blue | 9 L | 5 L |
| OVERALL RANKING | 42 | 20 |

What we claim is:

1. A process for making an agglomerated active with controlled release comprising the steps of mixing a particulate solid active material and a cellulose derivative co-binder in the form of a particulate solid and optionally also a portion of polyvinyl alcohol and then adding an aqueous agglomerating solution which contains polyvinyl alcohol binder whilst mixing and agglomerating and drying the agglomerate to obtain a dried agglomerate with average particle size in the range 1–2000 microns wherein the dried agglomerate comprises from 0.02 to 5% by weight based on the total weight of the agglomerate of polyvinyl alcohol.

2. A process according to claim 1, in which the cellulose derivative is carboxymethylcellulose.

3. A process according to claim 1, in which the agglomerating solution contains all the polyvinyl alcohol.

4. A process according to claim 3, in which the agglomerating solution is free of polymeric co-binder.

5. A process according to claim 1, in which the active material is a detergent component.

6. A process according to claim 5, in which the detergent component is a bleaching component.

7. A process according to claim 6, in which the bleaching component is a bleach activator.

8. A process according to claim 7, in which the bleach activator is Tetraacetylethylenediamine.

9. A process for making an agglomerated active with controlled release comprising the steps of mixing a particulate solid active material and a cellulose derivative co-binder in the form of a particulate solid and optionally also a portion of polyvinyl alcohol and then adding an aqueous agglomerating solution which contains polyvinyl alcohol binder and is substantially free of non-aqueous solvent and of co-binder, whilst mixing and agglomerating and drying the agglomerate to obtain a dried agglomerate with average particle size in the range 1 to 2000 microns wherein the dried agglomerate comprises from 0.02 to 5% by weight based on the total weight of the dried agglomerate of polyvinyl alcohol.

10. A process according to claim 9, in which the cellulose derivative is carboxymethyl cellulose.

11. A process according to claim 10, in which the active material is a bleach activator.

12. A process according to claim 11, in which the bleach activator is tetraacetylethylenediamine.

13. A process according to claim 9, in which the active material is a bleaching component.

14. A process according to claim 13, in which the bleaching component is a bleach activator.

15. A process according to claim 14, in which the bleach activator is tetraacetylethylenediamine.

16. A process for making an agglomerated active with controlled release comprising the steps of mixing in a high shear mixer, a cellulose derivative particulate solid active material and a co-binder in the form of a particulate solid and optionally also a portion of polyvinyl alcohol and then adding an aqueous agglomerating solution which contains polyvinyl alcohol binder whilst mixing and agglomerating in the high shear mixer, and subsequently drying the wet agglomerate to obtain a dried agglomerate with average particle size in the range 1–2000 microns where the dried agglomerate comprises 0.02 to 5% by weight based on the total weight of the dried agglomerate of polyvinyl alcohol.

17. A process according to claim 16, in which the active material is a bleaching component.

18. A process according to claim 17, in which the bleaching component is a bleach activator.

* * * * *